UNITED STATES PATENT OFFICE.

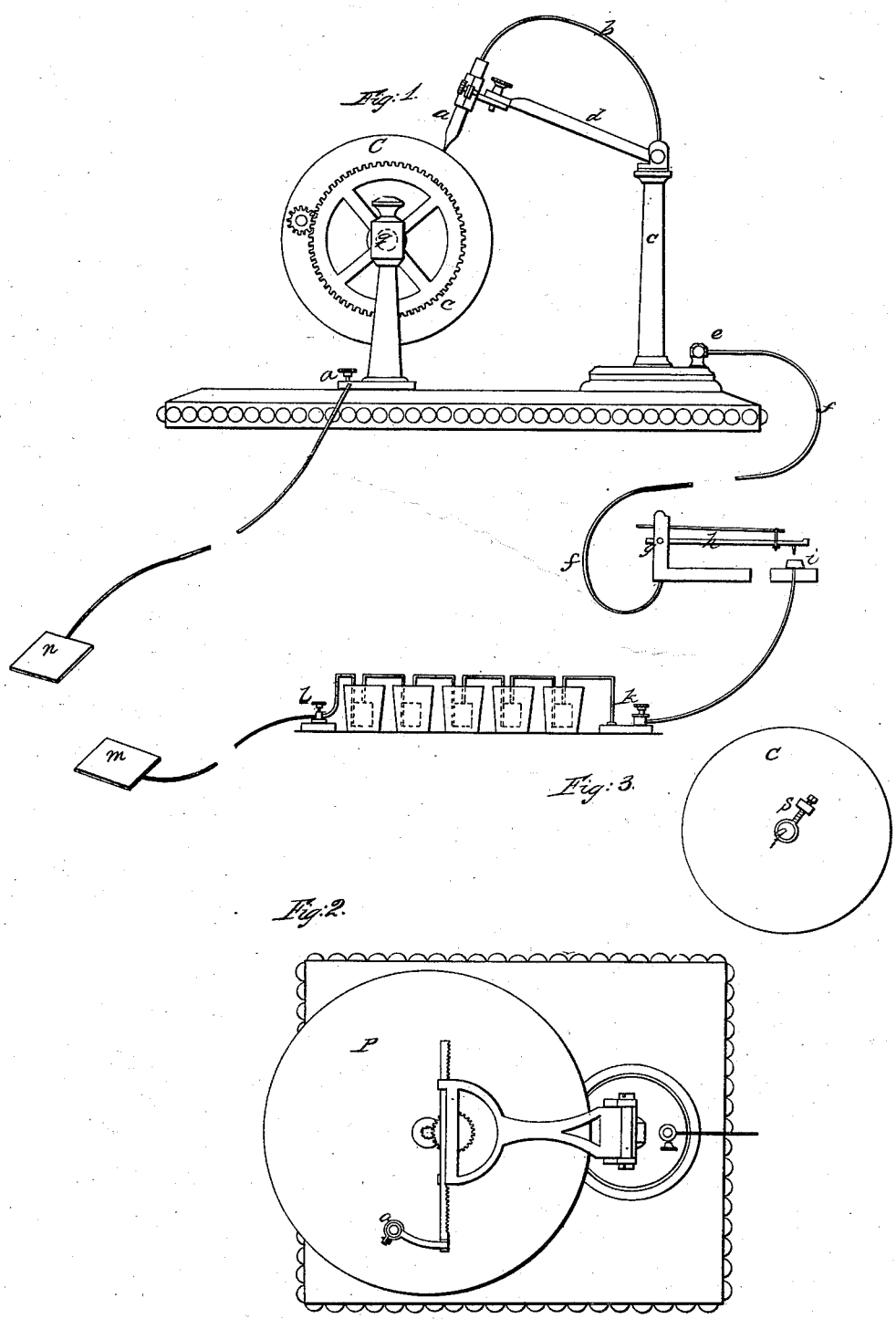

C. WESTBROOK, OF WASHINGTON, DISTRICT OF COLUMBIA, AND HENRY J. ROGERS, OF BALTIMORE, MARYLAND.

IMPROVEMENT IN ELECTRO-CHEMICAL TELEGRAPHS.

Specification forming part of Letters Patent No. 7,406, dated May 28, 1850.

*To all whom it may concern:*

Be it known that we, C. WESTBROOK, of Washington city, District of Columbia, and HENRY J. ROGERS, of the city and county of Baltimore, and State of Maryland, have made certain improvements in telegraphs to dispense with the use of paper on which the signs are recorded, called the "electro-metallic telegraph," which is described as follows, reference being had to the drawings hereunto annexed, which illustrate the connection of the recording-pen with the negative and positive poles of the battery to produce the circuit.

Figure 1 is an elevation, showing the end of the cylinder, part of the propelling-gear, and screw-shaft, tubular glass pen, in which the acidulated water and porous conductor or valve are placed, conducting-wires, manipulator, anvil, galvanic battery, and ground-plates. Fig. 2 is a plan, showing a horizontal circular plate on which the telegraphic signs may be made, pen-holder, and rack and pinion for moving the same gradually from the center as the plate turns horizontally on its axis, by which the telegraphic signals are formed in a spiral line from near the center to the periphery of the plate, the plate being turned by ordinary clock-work or by any convenient means; Fig. 3, end of cylinder, showing the chaser affixed thereto.

The nature of our invention consists in recording telegraphic signs on a metallic surface connected with the earth by a wire conductor at one end, and to a galvanic battery and the earth at the other end, of the circuit by the use of acidulated water or other fluid interposed between the point of the usual wire conductor leading from the operating apparatus, connected with a galvanic battery of the ordinary construction and the metallic surface, by which the use of paper is dispensed with, time also being saved in not having to moisten the chemically-prepared paper when it becomes too dry for use, and in having the telegraphic signs more clear and distinct on the metallic surface than on the paper, and in avoiding the inconvenience arising from the fumes from the chemicals employed in preparing the paper, and evils arising from the corrosion of instruments, and annoyance to the operators in preparing and using chemical paper, and other inconveniences.

The metallic recording-surface, after being filled and transferred, is simply cleansed by the application of a sponge or other soft substance saturated with acidulated water.

$a$ is the pen, made tubular, of some non-conducting substance—such as glass or ivory—open at both ends and made tapering at its lower end for containing a piece of sponge or other porous substance, through which the acidulated water or other fluid passes to the metallic surface on which the telegraphic signs are to be made, the bore of the pen being sufficiently large to contain the requisite quantity of acidulated fluid. By reducing the outlet at the tapered end of the pen the sponge or porous valve may be dispensed with.

A very small barrel-valve might be used to regulate the flow of the fluid instead of the porous substance.

$b$ is a short conducting-wire connected with the metallic stand $c$ or pen-holder $d$, and leading into the barrel of the pen $a$, and brought into immediate contact with the acidulated fluid in the pen, thus continuing the conducting-line to the surface of the metallic cylinder or plate, so that the current from the galvanic battery can be made to pass from the metallic conductor through the acidulated fluid or saline solution to the metallic surface of the plate or cylinder upon which the signs or marks are to be made.

$e$ is the binding-screw for securing the main wire. $f$ is the main wire connecting the receiving and transmitting stations. $g$ is the fulcrum of the manipulator. $h$ is the manipulator. $i$ is the anvil of the manipulator. $k$, platina pole of a galvanic battery. $l$ is the zinc pole of the battery, connected by a wire with the ground-plate $m$ at the transmitting-station. $n$ is also a ground-plate, connected with the binding-screw $o$ at the receiving-station.

$q$ is a horizontal stationary screw-shaft, upon which the cylinder moves to the right and left by means of a chaser, $s$, fixed to the end of the cylinder and revolving with the cylinder in contact with the spiral thread of said screw.

The cylinder may be made to move to the right and to the left over the shaft simultaneously with its rotary motion by forming a female screw through its center corresponding with the screw-shaft.

The rotary motion of the cylinder may be produced by ordinary clock machinery or by a coiled-spring pulley, cord, and weight, or by any convenient means.

The cylinder, having the combined rotary and longitudinal movement, as aforesaid, will cause the telegraphic signs to be recorded on the surface of the cylinder or plate in a continuous spiral line in the same manner that we have practiced for some time past.

Operation: Bear down the long arm of the key-lever or manipulator $h$, so that the point comes in contact with the anvil $i$. The current will instantly pass from the platina pole $k$ of the battery through the conducting-wire and acidulated solution contained in the pen to the surface of the cylinder C or plate P; thence to the ground-plates $n$ and $m$, the earth being part of the circuit, and by the wire to $l$, the zinc pole of the battery leaving a black mark or stain on the cylinder or plate, according to the length of time the circuit is closed, indicating the sign, mark, word, or sentence required to be recorded.

Having thus described the nature of our invention and improvement in telegraphs, what we claim, and desire to have secured to us by Letters Patent, is—

Recording telegraphic signs on the surface of a revolving metallic cylinder-plate or other equivalent surface by means of an acidulated liquid or saline solution or water held between the point of the wire conductor and the metallic recording-surface, by means of a non-conducting porous substance contained in a glass or other non-conducting reservoir in which the recording-fluid is contained, to which the electric current from a battery is applied by means of any of the known forms of manipulators and anvils used for making and breaking the circuit, the recording-fluid being applied to the metallic recording-surface substantially in the manner herein fully set forth, by which the use of every description of paper is dispensed with, thereby saving great expense in telegraphing.

In testimony whereof we have hereunto signed our names before two subscribing witnesses.

C. WESTBROOK.
HENRY J. ROGERS.

Witnesses:
WM. P. ELLIOT,
WM. DOUGLASS.